United States Patent Office 3,810,968
Patented May 14, 1974

3,810,968
PROCESS FOR MANUFACTURING SULFUR
DIOXIDE FROM AMMONIUM SULFATE
Philippe Renault, Noisy-le-Roi, Andre Deschamps,
Chatou, and Claude Dezael, Maisons-Laffitte, France,
assignors to Institut Francais du Petrole des Carburants
et Lubrifiants
Filed May 23, 1972, Ser. No. 256,078
Claims priority, application France, May 27, 1971,
7119411
Int. Cl. C01b 17/50; C01c 1/02
U.S. Cl. 423—356    25 Claims

ABSTRACT OF THE DISCLOSURE

Ammonium sulfate is a material of low industrial value which cannot be rejected without risk of water pollution. This material is converted to useful compounds, $SO_2$ and $NH_3$, by the present process which comprises reacting at least stoichiometrical proportions of a reducing agent and ammonium sulfate at 150–400° C. The reducing agent may be sulfur, hydrogen sulfide, ammonium thiosulfate or carbon monoxide.

---

Figure 1:
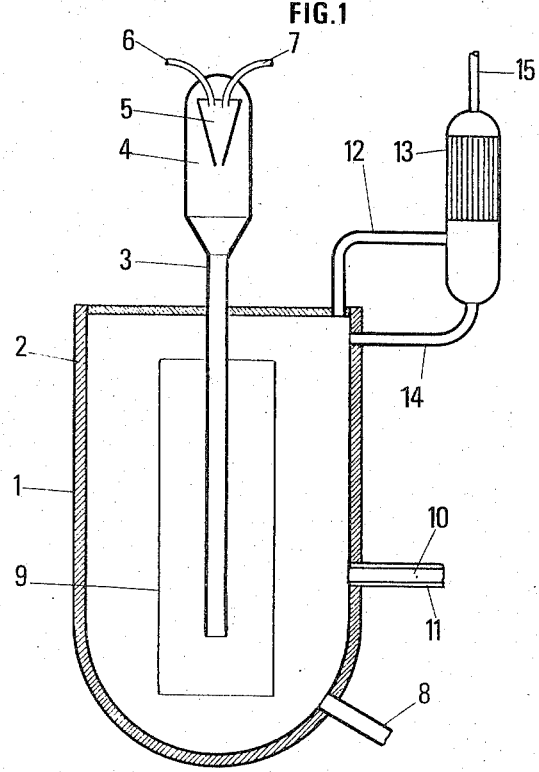

This invention concerns the manufacture of sulfur dioxide and ammonia from ammonium salts of sulfur and oxygen containing acids, particularly from ammonium sulfates and polythionates.

Ammonium sulfate is a material of low value which cannot be discharged to waste without risk of river pollution. It would thus be advantageous to recover the constituent component thereof, i.e. ammonia and sulfur oxides.

The known processes have been unsatisfactory in this respect. According to a known process, by way of example, neutral ammonium sulfate is converted by heating at 200–300° C. into ammonium hydrogen sulfate which is subsequently heated to between 400 and 500° C. A nonoxidizing gas may be used to increase the evolution of $SO_2$ and/or $SO_3$ and $NH_3$. This nonoxidizing gas may be hydrogen, carbon monoxide, sulfur vapor, hydrogen sulfide or preferably nitrogen. Below 400° C., this process cannot be used since the observed reaction rates are too low.

This process results in a reasonably good recovery of $SO_2$, but the recovery of $NH_3$, about 30 to 60%, is too low. It has now been found that ammonium sulfates, including the thionates, the polythionates, and the pyrosulfate, and particularly ammonium hydrogen sulfate may be converted to $NH_3$ and $SO_2$ with a high yield and a satisfactory reaction rate. The process of this invention which provides these results, comprises reacting an ammonium sulfate or polythionate with a reducing agent consisting of sulfur, ammonium thiosulfate, hydrogen sulfide, hydrogen or carbon monoxide, used during the whole reaction in a proportion equal to or in excess of the stoichiometrical amount with respect to the sulfate or polythionate, at a temperature of from 150 to 400° C., preferably from 180 to 350° C.

The excess of reducing agent, if any, may be for example up to 10 times, particularly 1.05–2 times the stoichiometrical amount of reducing agent.

The stoichiometrical proportion is defined by the following reaction equations:

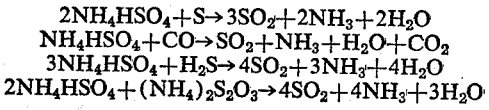

The molar ratio of the reducing agent to the sulfate is the same when neutral ammonium sulfate is used as starting material since the latter is first converted to the hydrogen sulfate according to the reaction:

In the following description, the solutions consisting of, for example, the melted or dissolved ammonium salts will be referred to as ammonium salts.

Ammonium salts are intended to comprise the mixtures to be converted to $SO_2$ and $NH_3$ consisting, for example, of ammonium sulfates, pyrosulfates, thionates, polythionates, thiosulfates and thionites.

If desired, inert liquids may be added thereto as dispersing or dissolving agents for the reactants.

A scavenging with an inert gas, for example nitrogen, carbon dioxide or methane, improves the reaction.

Hydrogen has a substantial reducing power; however it is usually insufficient for being used as the only reducing agent.

According to a preferred embodiment, the reactants are continuously or semicontinuously introduced, in the aforesaid defined proportions, into a reaction vessel containing a liquid mixture of the ammonium salts as previously defined, which constitutes the liquid phase in which the reaction takes place.

The ammonium salts may also be introduced as a dispersion into a gas flow containing the reducing agent or consisting of a reducing gas.

It is essential to avoid a temperature above 400° C. since otherwise the ammonia yield decreases; it is also essential to make use of a reducing agent in at least a stoichiometrical proportion; since otherwise both the conversion rate and the ammonia yield decrease.

An advantage of the process is that it can be used for treating mixtures of ammonium sulfates or polythionates with other ammonium salts, particularly ammonium sulfites, sulfides and thiosulfates. The latter salts decompose spontaneously without any consumption of reducing agent; the thiosulfates and sulfides are themselves reducing agents. Thus, there can be treated, according to the invention, ammonia liquors obtained by washing industrial off-gases containing sulfur dioxide and/or sulfur trioxide, by means of ammonia, ammonium carbonate or aqueous solutions of ammonium sulfites.

This invention also concerns a process and apparatus to liberate in one step sulfurous anhydride, ammonia and water from ammonium salts of the oxygen-containing sulfur compounds in solution or in the solid state.

According to a preferred embodiment, a portion of the reducing agent is burnt to provide a gas at high temperature which supplies the necessary heat to the reaction, the other portion of this agent being used to reduce the ammonium salts to sulfurous anhydride, ammonia and water. To this effect, there may be used an apparatus comprising essentially a reactor constituting the reaction zone, provided with inlets and outlets for the fluids, particularly a tube for feeding the reducing gas from a burner, which is housed in a combustion chamber, the stirring of the medium being performed by the gas injection.

The treatment of this invention is advantageously applied to brines optionally subjected to a vaporization step so as to eliminate the major part of the sulfites and water, at a moderate temperature, or to the salts obtained after thorough evaporation and drying. However the invention may be also applied to ammoniacal directly from the withdrawn absorption step.

The ammonium salts contained in the brines are reduced by the reducing gas and, to a lesser extent, by sulfur, if any, thereby producing sulfurous anhydride or sulfur and ammonia according to the selected reaction medium, at temperatures of from 150 to 400° C., preferably from 180 to 350° C.

By reaction medium, there is meant either the said ammonium salts, the melted salts or their mixtures, liquid in the temperature range, or a suspension in a gas of alkali metal salts, alumina, silicoaluminates, forming solid particles which, when contacted with the ammonium salts convert the same to $SO_2$, $NH_3$ and water. Such a suspension may be formed with ammonium salts, such as the neutral sulfates, the hydrogen sulfates, the polythionates and/or the thiosulfates.

The neutral sulfate and the hydrogen sulfate may also be used in the melted state. A mixture of these two salts may be used in such proportions that the ratio by weight of $$\frac{NH_4HSO_4}{NH_4HSO_4+(NH_4)_2SO_4}$$

be in the range of from 0.6 to 1 and preferably about 0.75. Among the other useful salts, there may be mentioned, for example, lithium hydrogen sulfate (M.P. 170.5° C.), neutral potassium acetate (M.P. 292° C.), potassium hydrogen acetate (M.P. 148° C.), potassium pyrosulfate (M.P. 300° C.), and among the ammonium salts, the acetate (M.P. 114° C.), the formate (M.P. 114–116° C.), the sulfamate (M.P. 132° C.), the thiocyanate (M.P. 149.6° C.) and the phosphates.

Mixtures of salts may be used, particularly eutectic mixtures, for example a mixture of 32% by weight of lithium carbonate, 33% by weight of sodium carbonate and 35% by weight of potassium carbonate which has a melting point of about 400° C.

As combustible gas which can be burnt for supplying heat to the reaction, there can be mentioned, for example, either natural gases, such as methane or mixtures of methane with other hydrocarbons, or synthetic gases such as carbon monoxide or mixtures of carbon monoxide with hydrogens obtained by reacting steam with coal or hydrocarbons at high temperature or by pyrolizing coal or carbonaceous materails, or also gases obtained by incomplete combustion of coal and hydrocarbons, or outflows from various industries, either pure or as mixtures, such as $H_2S$ or $H_2S+H_2$ containing or not impurities such as COS and/or $CS_2$.

The organic compounds which are able to liberate CO and/or $H_2$ by thermal decomposition may also be mentioned, for example methanol, formaldehyde, formic acid acid oxalic acid.

Some of these gases act directly as reducing agents with respect to the sulfates and the polythionates, for example $H_2S$, CO and $H_2$. Others, such as for example, hydrocarbons, liberate reducing gases by partial combustion.

When hydrogen sulfide is used as combustible gas, the proportion of air or oxygen fed to the burner will advantageously be lower than the theoretical proportion so as to avoid a too large excess of oxygen in the reaction medium.

If the selected combustible is a hydrocarbon, for example methane, ethane, propane, butane or a heavier hydrocarbon, it will be necessary to ensure a good combustion thereof by introduction of a small excess of air or oxygen.

When oxygen is present in the combustion gas, this excess may be eliminated by injecting small amounts of $H_2S$ or sulfur into the gas, resulting in the formation of $SO_2$. In any case, it is strictly necessary that a sufficient proportion of reducing agent be present in the reaction zone so that the stoichoimetrical proportions of the reactants, as hereinbefore defined, be present.

The pressure in the apparatus is usually slightly greater than atmospheric pressure, for example 1.1 bars absolute. Higher pressures may be used without inconvenience, for example pressures up to 10 bars and preferably from 1.05 to 3 bars absolute.

This technique results in the transformation all ammonium sulfates contained in brine to as well as the ammonium thiosulfates and polythionates and, of course, the sulfites to $SO_2$, $NH_3$ and water.

The apparatus which is used consists essentially of a reactor, i.e. a metal vessel whose walls may be protected by a sheet of refractory material. Taking into account the nature of the reaction mixture and the temperature conditions, it is desirable that the thickness of the coating be sufficient to maintain the external temperature of the jacket not higher than 250° C. in order to avoid possible corrosion at the liquid level area of this jacket. It is obvious that the selected refractory material ought to be inert with respect to the constituents of the reaction medium and that the reactor must be made of a metal withstanding corrosion.

This reactor may be made, for example, of a stainless steel such as austenitic or austenoferritic chromium and nickel bearing steels, with or without molybdenum and possibly other additives, such as copper and/or silicon, ferrosilicon alloys, alloys of nickel with, for example, iron, molybdenum and/or chromium. Carbon-steel may be used, in some cases, optionally with an anodic protection system to maintain it passive.

Various protective coatings may be used, for example inorganic coatings, for example, glass, ceramic glass, acid resistant or refractory ceramics used in the form of concrete or bricks which may basically contain alumina, silica, chromium oxide, zirconia, carbon, silicium or a mixture thereof.

The reactor may be provided with a tube for feeding gas from a burner contained in a combustion chamber. As the hot gas must be directly contacted with the liquid medium contained in the reactor, this tube may be so arranged as to be immersed in the liquid so as to dive discharge the gas into the liquid material. However the gas may be supplied to the reactor from an external tube usually opening at the lower part thereof. The latter arrangement is more easily disassembled and makes easier the cleaning of the apparatus.

The reactor is also provided with at least one inlet pipe for brine. It has been shown that, when brine was introduced through a pipe having insulated walls not in contact with the reactor walls, incipient salt crystallization was avoided at the level of the injection device. The pipe may be provided for example, with a jacket through which a fluid is circulated at a temperature of, for example, from 20 to 350° C. and preferably 120 to 150° C.

The reactor may be optionally connected to heat exchangers of the conventional type at its upper part, in the gas discharge zone, so as to lower the gas temperature down to about 160–190° C. and let sulfur fall into the reactor, which sulfur would otherwise escape with the gas at the prevailing high temperatures.

Stirring is performed by the gas introduced into the reactor. Internal devices may improve this stirring. For example, packing, perforated trays, baffle plates or perforations serially arranged in the combustion gas feed pipe may be used.

A convenient device may be obtained by creating a gas-siphoning system inside the reactor. It is sufficient to place a jacket around the tube from the burner, which, in that case, is immersed in the bath, so that the liquid displaced by the gas may flow up between the jacket and the reactor wall.

The following examples are given for illustration, not limitation.

EXAMPLE 1

Hydrogen sulfide is supplied from a first pipe at a rate of 0.4 mole per hour to a reaction vessel maintained at a temperature of 335° C. Neutral ammonium sulfate in the form of an aqueous solution is introduced therein through another pipe at a rate of 0.1 mole per hour.

The effluent issued from the reaction vessel consists of 0.2 mole per hour of ammonia, 0.36 mole per hour of hydrogen sulfide, 0.13 mole per hour of sulfurous anhydride and steam.

EXAMPLE 2

Hydrogen sulfide is introduced from a first pipe, at a rate of 0.033 mole per hour, into a reaction vessel maintained at the same temperature as in Example 1. An aqueous solution of neutral ammonium sulfate is introduced therein from another pipe at a rate of 0.1 mole per hour.

The effluent issued per hour from the reactor consists of 0.2 mole ammonia, 0.13 mole sulfurous anhydride, steam and only traces of hydrogen sulfide.

EXAMPLE 3

Example 2 is repeated, except that the hydrogen sulfide has a 10% molar content of carbon disulfide and is introduced at a rate of 0.027 mole per hour. The evolved gas contains 0.2 mole per hour of ammonia, 0.13 mole per hour of sulfurous anhydride and traces of hydrogen sulfide.

EXAMPLE 4

Example 2 is repeated, except that carbon monoxide is introduced at a rate of 0.20 mole per hour. The effluent consists of 0.2 mole per hour of ammonia, 0.13 mole per hour of sulfurous anhydride and 0.1 mole per hour of CO.

EXAMPLE 5

Example 3 is repeated, except that carbon disulfide is replaced by carbon oxysulfide COS.

An aqueous solution of neutral ammonium sulfate containing ammonium thiosulfate is introduced through the second pipe. 0.1 mole per hour of sulfate and 0.025 mole per hour of thiosulfate are thus introduced.

The evolved effluent consists of 0.35 mole per hour of ammonia, 0.2 mole per hour of $SO_2$ and steam.

EXAMPLE 6

Example 5 is repeated, except that ammonium tetrathionate is introduced in admixture with neutral ammonium sulfate. 0.1 mole of sulfate and 0.03 mole of tetrathionate are thus introduced in 1 hour.

0.04 mole of $H_2S$ are injected during the same time. The effluent consists of 0.26 mole of $NH_3$, 0.20 mole of $SO_2$ and traces of $H_2S$.

EXAMPLE 7

0.1 mole per hour of a solution of neutral ammonium sulfate is introduced through a pipe into a reactor maintained at 350° C. and containing a mixture of ammonium hydrogen phosphates; 0.05 mole per hour of ammonium thiosulfate is introduced through another pipe.

The evolving effluent consists of 0.2 mole per hour of $SO_2$, 0.3 mole per hour of $NH_3$ and steam.

EXAMPLE 8

A combustion gas from a burner 5 is introduced through a ferrosilicon nozzle 3, connected to a combustion chamber 4 and diving into a cylindrical reactor 1, shown on FIG. 1, of about 10m.³ capacity.

The walls thereof are made of carbon steel and internally lined with a 8 cm. layer of refractory material 2. The reactor is closed at its upper part and connected to a condenser 13. The burner is fed with $H_2S$ and air through pipes 6 and 7 at the respective rates of 7 kmoles and 15 kmoles per hour.

This combustion gas is contacted in the reactor with molten sulfur issued from pipe 8 and the temperature is raised to about 350° C.

A cylindrical structure 9, surrounding nozzle 3, is provided in the reactor for sulfur circulation by means of the combustion gas from the nozzle.

Brine is injected through pipe 10 into the reactor, its composition corresponding to the following feed rates:

$NH_4HSO_3$=0.5 kmole/hour,
$(NH_4)_2SO_3$=0.5 kmole/hour,
$(NH_4)_2SO_4$=1 kmole/hour,
$(NH_4)_2S_2O_3$=0.5 kmole/hour,
$H_2O$=2.5 kmoles/hour.

This pipe is provided, in the vicinity of the reactor, with a double wall 11 through which steam is circulated at about 120° C.

From the outlet of the reactor the hourly gas effluent escaping through line 12, contains:

| | Kmoles |
|---|---|
| $SO_2$ | 3.5 |
| $NH_3$ | 4.5 |
| $H_2S$ | 2 |
| $H_2O$ | 10 |
| S vapor | 9 |
| $N_2$ | 12 |

From the outlet 15 of the condenser 13 of the indirect contact type, a gas is collected, whose composition is approximately the same as at the inlet of this condenser. However it contains no more than 0.3 kmole per hour of sulfur vapor, the remaining sulfur being fed back to the reactor through line 14. This condenser cools the gas down to about 130–150° C.

The excess of formed sulfur may be withdrawn from the reactor through line 8.

EXAMPLE 9

Figure 2:
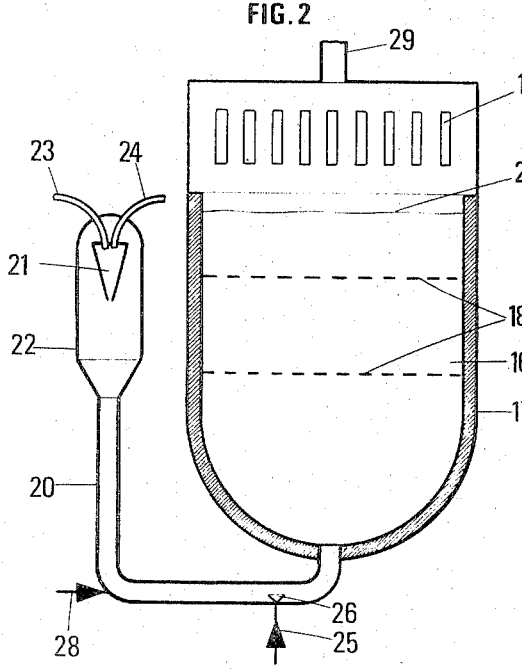

There is used a reactor 16 as shown on FIG. 2, of 2 m.³ capacity, whose walls made of special stainless steel containing iron, chromium, nickel, molybdenum and copper are internally lined with an acid resistant concrete 17.

This reactor is internally provided with 2 horizontal perforated trays 18 and, at its top, with a heat exchanger 19 which lowers the temperature of the effluent gas down to about 180° C. A nozzle 20, opening at its bottom, conveys the combustion gases issued from a burner 21 placed in a combustion chamber 22 and fed with propane and air through the pipes 23 and 24. The nozzle is made of refractory bricks and its diameter is about 30 cm. Brine is injected at a rate of 50 kg. per hour through pipe 25 provided with a spraying nozzle 26 and whose walls are thermally insulated. Its composition is the following:

| | Moles/kg. |
|---|---|
| $NH_4HSO_3$ | 3 |
| $(NH_4)_2SO_3$ | 1.18 |
| $(NH_4)_2SO_4$ | 2.23 |
| $(NH_4)_2S_2O_3$ | 0.84 |
| $H_2O$ | 12.55 |

The sulfites and the thiosulfate, at the temperature prevailing in the reactor, i.e. 330° C., decompose to $SO_2$, $NH_3$, $H_2O$ and sulfur corresponding to the thiosulfate, while the neutral sulfate, under these conditions, is partially converted to hydrogen sulfate which is liquid at this temperature and accumulates in the reactor.

When the liquid phase level in the reactor attains a convenient level 27, $H_2S$ is introduced through line 28 and the nozzle at the rate of 40 moles per hour.

The gas feeding rate to the burner is so adjusted as to maintain the temperature of the bath in the reactor at 330° C. Under these conditions, the gas effluent collected through pipe 29, contains 404 moles per hour of $SO_2$, 575 moles per hour of $NH_3$, 1.6 mole per hour of $H_2S$, water, nitrogen and 42 moles per hour of sulfur vapor.

EXAMPLE 10

Figure 3:
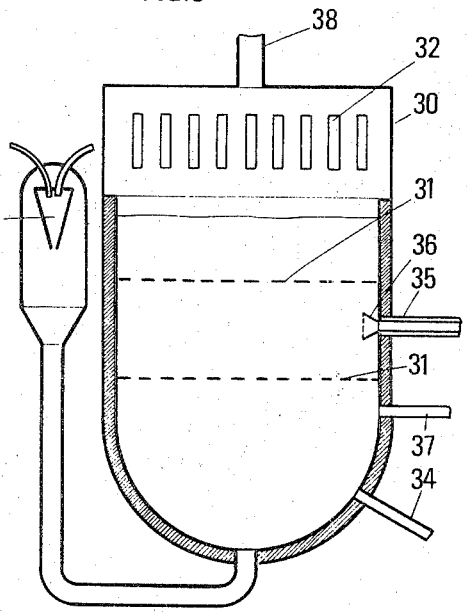

There is used a reactor 30 (FIG. 3), similar to that of Example 9, provided with perforated trays 31 and a plate condenser 32, and whose capacity is also 2 m.³. The walls are made of stainless steel (20–25 Mo-Cu) but not internally lined with refractory material. Burner 33 is fed with propane and air.

The temperature in the reactor is about 380° C. and molten sulfur is introduced through pipe 34.

The propane feeding of the burner is discontinued while the air admission is maintained.

Brine is injected, at the rate of 50 kg. per hour, through pipe 35 provided with a spraying nozzle 36 and thermally insulated by means of refractory material in sufficient thickness.

This brine results from the absorption with ammonia of an industrial gas containing $H_2S$ and $SO_2$; it contains per kilogram:

| | Moles |
|---|---|
| $NH_4HSO_3$ | 3 |
| $(NH_4)_2SO_3$ | 1.18 |
| $(NH_4)_2S_2O_3$ | 0.84 |
| $(NH_4)_2S_3O_6$ | |
| $(NH_4)_2S_4O_6$ | 2.23 |
| $(NH_4)_2S_5O_6$ | |
| $H_2O$ | 12.55 |

$H_2S$ is introduced through pipe 37 into the reactor at the rate of 74 moles per hour.

During the reaction, sulfur is formed which adds to the reaction mixture, and whose excess is withdrawn through pipe 34.

A gas effluent containing, per hour, 497.7 moles of $SO_2$, 575 moles of $NH_3$, water, nitrogen and sulfur vapor is collected through pipe 38 at the top of the reactor.

10 kg. of sulfur are collected per hour.

EXAMPLE 11

Figure 4:
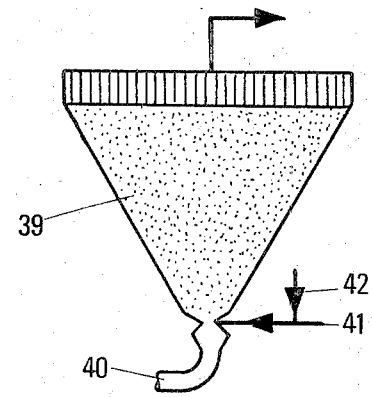

A conical reactor 39 is used, as shown on FIG. 4. Its capacity is about 2 m.³, it is useful height about 2.25 m. and its diameter at the top section 1.50 m.

Nozzle 40 which conveys the combustion gas, as shown in Example 9, opens at the bottom of the reactor through a "convergent-divergent" at the middle of which dry ammonium salts are injected through line 41.

There is introduced a material having the following composition:

| | Kg./hr. |
|---|---|
| $NH_4HSO_3$ | 15 |
| $(NH_4)_2SO_3$ | 6.8 |
| $(NH_4)_2SO_4$ | 14.7 |
| $(NH_4)_2S_2O_3$ | 6.2 |

Sodium carbonate is introduced into the reactor and becomes fluidized by the combustion gas. The burner is fed with propane and air. The temperature of the reactor is brought to about 350° C. The salts are then injected with a synthesis gas (line 42) having the following composition by volume:

$H_2$, 48.8%; CO, 20.9%; $N_2$, 20.8%; $CH_4$, 0.3%; $CO_2$, 9.2%, and a feeding rate of 5 m.³ per hour.

A gas effluent is collected at the outlet from the reactor. It contains:

| | Moles/hr. |
|---|---|
| $H_2S$ | 9.4 |
| S | 56.4 |
| $SO_2$ | 349.2 |
| $NH_3$ | 584.5 |

It also contains nitrogen, water, carbon dioxide and methane.

What we claim as our invention is:

1. A process for converting ammonium sulfates with a satisfactory reaction rate into high yields of essentially only sulfur dioxide, ammonia and water, which comprises:
   (a) reacting ammonium sulfates in the liquid phase at a superatmospheric pressure and at a temperature of 150–400° C. with at least a stoichiometric amount of a reducing agent selected from the group consisting of elemental sulfur, hydrogen sulfide and ammonium thiosulfate; and
   (b) maintaining said reducing agent in at least a stoichiometric amount throughout the course of the reaction and sufficient to ensure essentially complete conversion of said ammonium sulfate.

2. The process according to claim 1, wherein the reaction temperature is 180–350° C.

3. The process according to claim 1, wherein said superatmospheric pressure is up to 10 bars absolute.

4. The process according to claim 1, wherein the reducing agent is maintained at 1–5 times the stoichiometrical amount thereof.

5. The process according to claim 1, wherein said ammonium sulfates are selected from the group consisting of sulfates, pyrosulfates, thionates and polythionates.

6. The process according to claim 5, wherein said sulfates comprise a mixture of ammonium hydrogen sulfate and ammonium neutral sulfate.

7. The process according to claim 6, wherein said mixture is present in a ratio

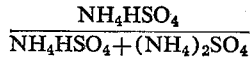

of from 0.6 to 1.

8. The process according to claim 7, wherein said ratio is about 0.75.

9. The process according to claim 7, wherein ammonium sulfate is treated in admixture with at least one ammonium sulfite.

10. The process according to claim 1, wherein ammonium sulfate is used as ammonia-containing lye obtained by washing of an industrial gas containing sulfur dioxide and sulfur trioxide.

11. The process according to claim 1, wherein a hot gas obtained by burning a portion of said reducing agent is introduced into the reaction zone to supply the necessary heat to the reaction.

12. The process according to claim 1, further comprising scavenging the liquid phase with an inert gas.

13. The process according to claim 1, further comprising cooling discharged gaseous effluent to 160–190° C. and letting sulfur which would otherwise escape with the effluent fall into the reactor.

14. The process according to claim 1, wherein said reducing agent is ammonium thiosulfate.

15. The process according to claim 14, wherein said ammonium thiosulfate is maintained at 1–5 times the stoichiometric amount thereof.

16. The process according to claim 15, wherein said superatmospheric pressure is about 1.05–3 bars, absolute.

17. The process according to claim 15, wherein the reaction temperature is 180–350° C.

18. The process according to claim 15, wherein said ammonium sulfates are selected from the group consisting of sulfates, pyrosulfates, thionates and polythionates.

19. The process according to claim 18, wherein said sulfates comprise a mixture of ammonium hydrogen sulfate and ammonium neutral sulfate.

20. The process according to claim 19, wherein said mixture is present in a ratio

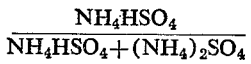

of from 0.6 to 1.

21. The process according to claim 20, wherein said ratio is about 0.75.

22. The process according to claim 20, wherein ammonium sulfate is treated in admixture with at least one ammonium sulfite.

23. The process according to claim 20, wherein ammonium sulfate is used as ammonia-containing lye obtained by washing of an industrial gas containing sulfur dioxide and sulfur trioxide.

24. The process according to claim 15, further comprising scavenging the liquid phase with an inert gas.

25. The process according to claim 15, further comprising cooling discharged gaseous effluent to 160–190° C. and letting sulfur which would otherwise escape with the effluent fall into the reactor.

References Cited
UNITED STATES PATENTS 3,275,407  9/1966  Furkert et al. ———— 423—356
3,321,275  5/1967  Furkert et al. ———— 423—356

OSCAR R. VERTIZ, Primary Examiner

H. S. MILLER, Assistant Examiner

U.S. Cl. X.R.

423—541